United States Patent Office 3,192,238
Patented June 29, 1965

3,192,238
17,20-DIMETHYL-18-NORPREGNENES
Leslie A. Freiberg, Waukegan, Ill., assignor to Abbott Laboratories, North Chicago, Ill., a corporation of Illinois
No Drawing. Filed Sept. 9, 1963, Ser. No. 307,323
9 Claims. (Cl. 260—397.45)

The present invention is directed to new steroids and a method for their preparation. More particularly, this invention is concerned with the manufacture of substituted 17,20-dimethyl-18-norpregn-13-enes.

The compounds embraced by the present invention are those of the general formula

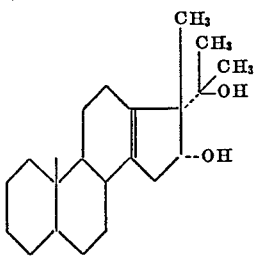

wherein the A/B rings have one of the following configurations:

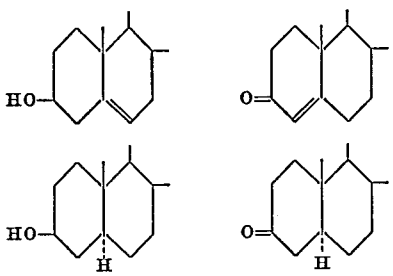

These compounds are useful as hormonally active compounds; in particular, they have androgenic activity in warm-blooded animals. Furthermore, these compounds can be used for the preparation of other steroids such as those esterified in the 3β- and/or 16α-position with lower fatty acids which are also hormonally active.

In a general embodiment, compounds of the present invention are made by rearranging a compound of the formula

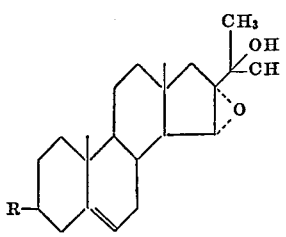

wherein R is a oxo, a hydroxy or an acyloxy group, in the presence of boron trifluoride etherate in an inert, anhydrous organic solvent at a temperature between 0° and 36° C. The term "inert" is used herein to express that the solvent does not react with either the starting materials or the expected product. Examples of such inert solvents are benzene, n-pentane, diethyl ether, tetrahydrofurane, cyclohexane, and the like.

To better understand the process for preparing the compounds of the present invention, reference is made to the following examples which, however, are not means to limit the invention in any way.

EXAMPLE I

*3β - acetoxy - 17β,20 - dimethyl - 18 - nor - 17α - pregn-5,13-diene-16α,20-diol*

To a solution of 2.85 grams of 3β-acetoxy-16α,17α-epoxy-20-methyl-5-pregnen-20-ol (described by W. Cole et al. in J. Org. Chem., volume 19, page 131, of 1953) in 125 ml. of diethyl ether, is added 1.0 ml. of freshly distilled borin trifluride etherate. The mixture is swirled and allowed to stand for 20 minutes at 25° C. whereupon 100 ml. of water containing 2.0 grams of potassium carbonate is added. After shaking the mixture, the ether phase is isolated, washed with water, dried with anhydrous magnesium sulfate, and the ether is distilled. The crude product, weighing 2,72 grams, is taken up in 10 ml. of benzene and chromatographed on 100 grams of neutral activity III alumina. The material eluted with benzene containing from 1% to 10% diethyl ether is crystallized from petroleum ether (fraction boiling at 60–68° C.) to give 0.50 gram of 3β-acetoxy-17β,20-diemthyl - 18 - nor - 17α - pregn - 5,13 - diene - 16α,20-diol melting at 148–150° C. The analytical data of 74.29% C and 9.25% H is in agreement with the values calculated for the compound with empirical formula $C_{24}H_{36}O_4$.

When in the above process the material is taken up in a small amount of ether prior to the chromatographic separation and diluted with 10–20 volumes of petroleum ether (B.P. 60–68°), an oil separates. The solution is decanted and concentrated and the concentrate is used for the chromatogram which then produces a much cleaner separation.

EXAMPLE 2

*17,20 - dimethyl - 18 - nor - 17α - pregn - 5,13 - diene-3β,16α,20-triol*

A solution of 0.34 gram of 3β-acetoxy-17β,20-dimethyl-18-nor-17α-pregn-5,13-diene-16α,20-diol and 0.37 gram of potassium carbonate in 17 ml. of 88% aqueous methanol is refluxed for 4 hours. The material is crystallized by the addition of 15 ml. of water, filtered, and recrystallized from toluene to give 0.16 gram of 17β,20-dimethyl-18-nor-17α-pregn - 5,13 - diene - 3β,16α,20 - triol melting at 200–03° C. The analytical data of 76.64% C and 9.84% H agrees with the calculated values for the compound with empirical formula $C_{22}H_{34}O_3$.

From the above 17β,20 - dimethyl-18-nor-17α-pregn-5,13-diene-3β,16α,20-triol, the above shown modifications of the A/B rings can easily be accomplished. Thus, for example, 17β,20 - dimethyl-18-nor-17α-pregn-4,13-diene-16α,20-diol-3-one is obtained by oxidation of the hydroxy group in the 3-position by known methods, and the corresponding 4- or 5-saturated compounds, e.g., 17β,20-dimethyl-18-nor-17α-pregn-13-ene-3β,16α,20-triol 3β-acetoxy-17β,20-dimethyl-18-nor-17α-pregn - 13 - ene - 16α,20-diol, and 17β,20 - dimethyl-18-nor-17α-pregn - 13 - ene-16α,20-diol-3-one are accessible by hydrogenation of the double bond in the precursors named above (compounds of Examples 1 and 2) and/or oxidation of the 3 alcohol function. The hydrogenation is best carried out with gaseous hydrogen in the presence of a platinum catalyst until 1 mole of hydrogen is absorbed.

EXAMPLE 3

*3β,16α - diacetoxy - 17β,20 - dimethyl - 18 - nor - 17α-pregn-5,13-diene-20-ol*

A mixture of 48.1 mg. of 3β-acetoxy-17β,20-dimethyl-18-nor-17α-pregn-5,13-diene-16β,20-diol, 1.2 ml. of acetic anhydride and 2.3 ml. of pyridine is allowed to stand overnight at room temperature. A small amount of ice is added to decompose excess acetic anhydride. Additional water is added, and the 3β,16α-diacetoxy-17β,20-dimethyl-18-nor-17α-pregn-5,13-diene-20-ol crystallizes. It melts at 125–26° C. and the analytical data of 72.50% C and 8.89% H confirm the values of the compound with empirical formula $C_{26}H_{38}O_5$.

Others may practice the invention in any of the numerous ways which will be suggested to one skilled in the art by the present disclosure. All such practice of the invention is considered a part thereof provided it falls within the scope of the appended claims.

I claim:

1. A compound of the formula

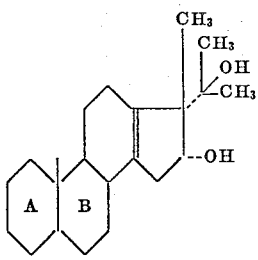

wherein the A/B rings have a partial structure selected from the group consisting of

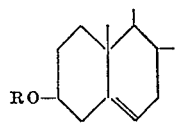 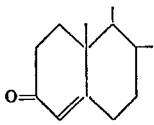 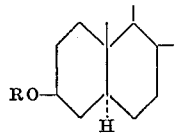

and

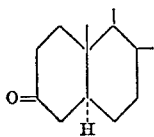

wherein R is selected from the group consisting of hydrogen and acetyl.

2. 3β - acetoxy - 17β,20 - dimethyl - 18 - nor - 17α-pregn-5,13-diene-16α,20-diol.

3. 17β,20 - dimethyl - 18 - nor - 17α - pregn - 5,13-diene-3β,16α-20-triol.

4. 17β,20 - dimethyl - 18 - nor - 17α - pregn - 4,13-diene-16α,20-diol-3-one.

5. 17β,20 - dimethyl - 18 - nor - pregn - 13 - ene-3β,16α,20-triol.

6. 3β - acetoxy - 17β,20 - dimethyl - 18 - nor - 17α-pregn-13-ene-16α,20-diol.

7. 17β,20 - dimethyl - 18 - nor - 17α - pregn - 13 - ene-16α,20-diol-3-one.

8. 3β,16α - diacetoxy - 17β,20 - dimethyl - 18 - nor-17α-pregn-5,13-diene-20-ol.

9. The process of rearranging a compound of the formula

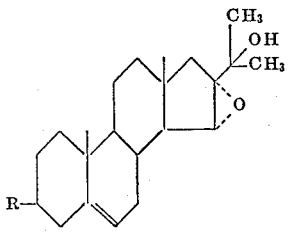

to

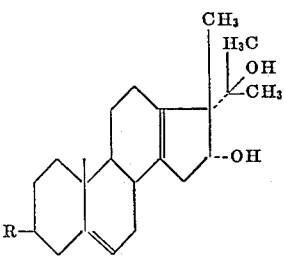

wherein R is selected from the group consisting of hydroxy, oxo and acyloxy, with boron trifluoride etherate at a temperature between 0° and 36° C. in the presence of an inert, anhydrous, organic solvent.

References Cited by the Examiner

Bowers et al.: "Tetrahedron," vol. 8, 1960, pp. 116–125.
Collins: "J. Chem. Soc.," 1959, pp. 3919–3928.

LEWIS GOTTS, *Primary Examiner.*